UNITED STATES PATENT OFFICE.

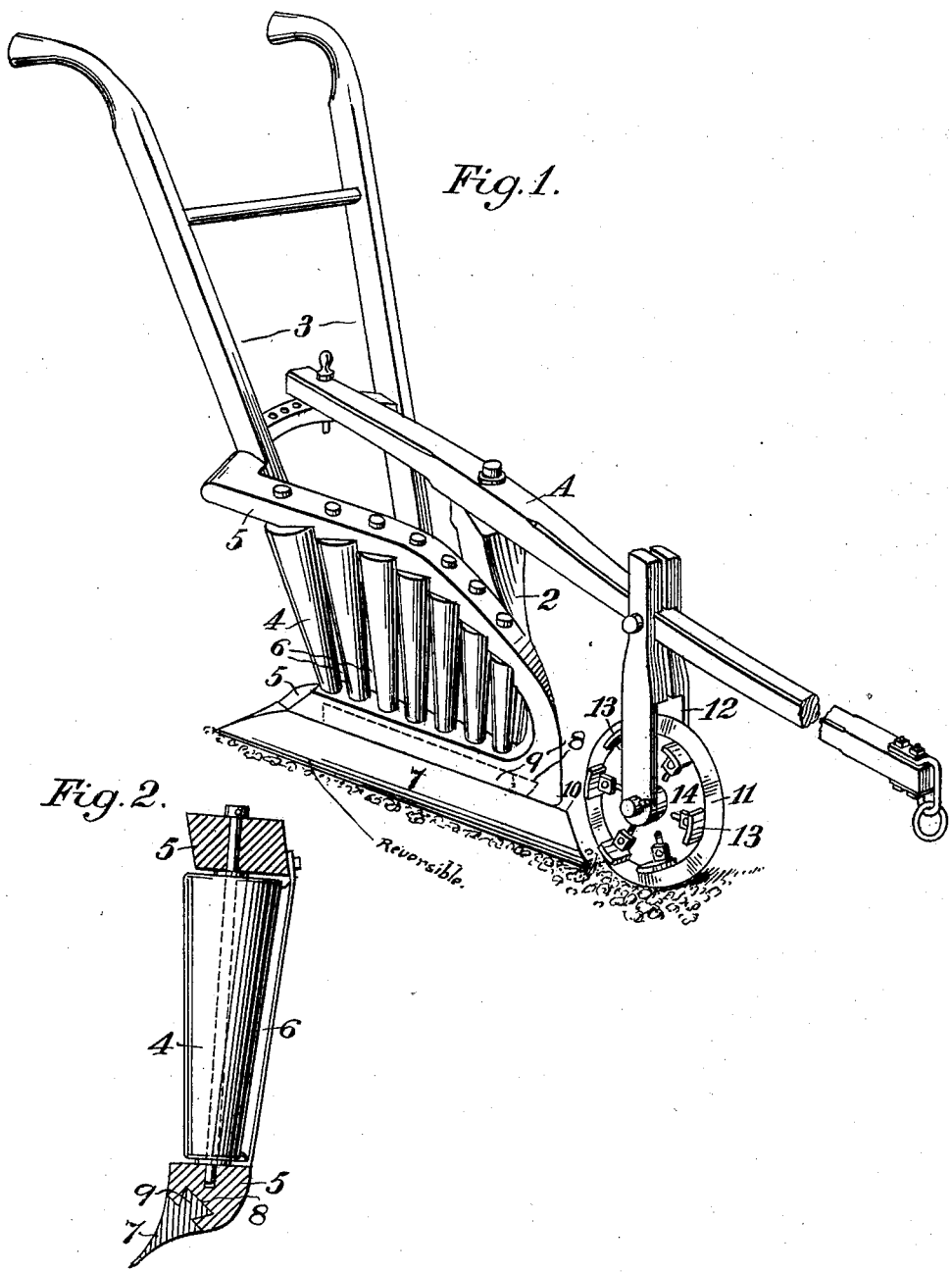

JOHN W. BARNES, OF SAN FRANCISCO, CALIFORNIA.

PLOW.

SPECIFICATION forming part of Letters Patent No. 711,091, dated October 14, 1902.

Application filed April 28, 1902. Serial No. 104,988. (No model.)

*To all whom it may concern:*

Be it known that I, JOHN W. BARNES, a citizen of the United States, residing in the city and county of San Francisco, State of California, have invented an Improvement in Plows; and I hereby declare the following to be a full, clear, and exact description of the same.

My invention relates to an improved plow; and it consists of the parts and the constructions and combinations of parts, which I will hereinafter describe and claim.

Having reference to the accompanying drawings, Figure 1 is a perspective view of my invention. Fig. 2 is a transverse vertical section through the moldboard and plowshare.

A represents the plow-beam, pivotally secured to the post 2 and having its rear end adjustable on the handles 3, whereby the plow may be adjusted in relation to the line of draft according to the nature of the furrow to be turned.

The moldboard instead of being a smooth metal plate, as usual, consists of a series of inverted cone-shaped rollers 4, pivoted in the skeleton mold-frame 5. The size, shape, number, and disposition of the rollers are such as to give the proper throw to the soil turned up.

A scraper 6 is placed on the inner side of each roller to remove the earth that may collect thereon and so prevents their becoming clogged.

The lower horizontal portion of the frame 5 is adapted to receive the reversible self-sharpening plowshare 7 and for this purpose is provided with a dovetailed groove 8, in which the tongue 9 on the share is adapted to lock. The groove is open at the front end of the moldboard to receive the share and is closed at the rear to form a stop against which the tongue 9 abuts. The latter terminates short of either end of the share, so that when the share is in position on the board the line of the point 10 will run properly into the cutting edge of the moldboard.

The share 7 has its sides symmetrically concaved, and its points are beveled on opposite sides to permit of perfect reversibility.

The colter 11 is journaled in the standard 12, so that the lowest point of the colter is in the same plane with the lower edges of the share and landside.

The roller-moldboard turns the slice perfectly and minimizes the friction and consequent load on the team, while the share 7 after it has become worn so that its point has become so dulled and its edge rounded upwardly as to tend to climb out of the furrow may be reversed to present a sharp point and a fresh horizontal cutting edge.

Having thus described my invention, what I claim, and desire to secure by Letters Patent, is—

1. In a plow, the combination with a moldboard, of a reversible self-sharpening share having concaved sides and having one edge of greater length than the other, and means upon the upper edge of the share for attaching it to the moldboard.

2. In a plow, the combination with a moldboard of a reversible self-sharpening share, consisting of a bar having its sides symmetrically concaved and converging to a sharp edge on the lower side and means upon the opposite side by which it is attached to the moldboard.

3. In a plow, the combination with a moldboard, of a reversible share, consisting of a bar having concaved sides, its lower edge of greater length than the edge adjacent to the share and its ends beveled oppositely.

4. In a plow, the combination of a moldboard having a groove along its lower horizontal edge, said groove open at one end and closed at the other to form a stop, and a plowshare having a tongue upon one edge adapted to enter the groove endwise and lock the share in place.

5. In a plow, the combination of a moldboard having a groove along its lower edge, and a reversible share having symmetrically-concaved sides, pointed ends, and a tongue on one edge of lesser length than the share, said tongue adapted to fit and lock in said groove.

In witness whereof I have hereunto set my hand.

JOHN W. BARNES.

Witnesses:
A. Q. JEFFERIS,
ALFRED A. ENQUIST.